Nov. 24, 1964     L. PERAS     3,158,365
MOUNTING OF WHEEL SUSPENSION ARMS OF VEHICLES
Filed Dec. 17, 1962
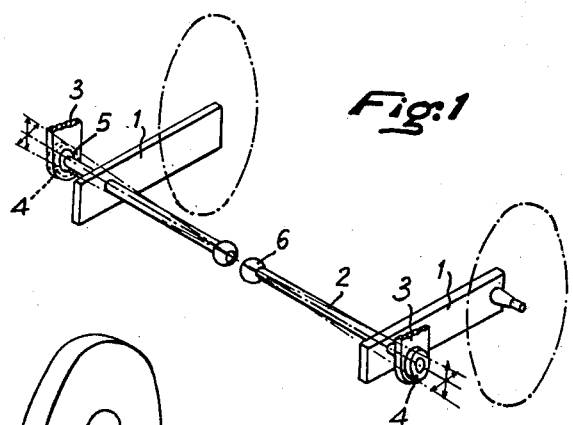
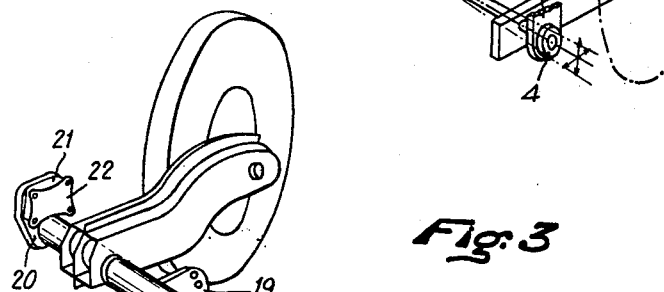
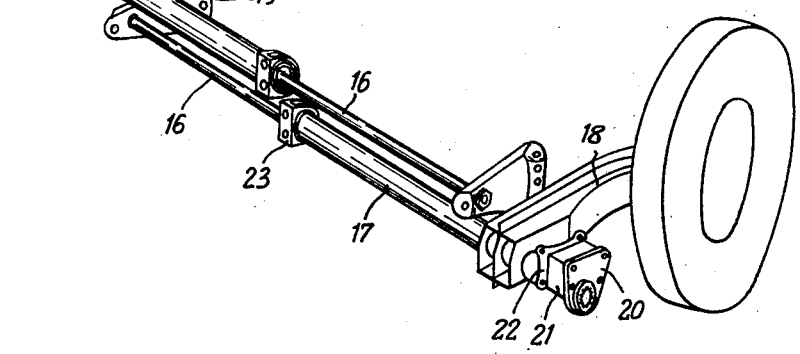
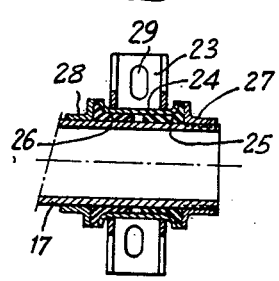
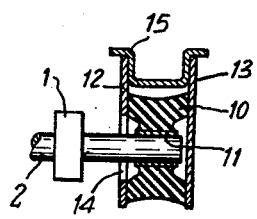
Inventor
Lucien Peras
By Stevens, Davis, Miller & Mosher
Attorneys United States Patent Office
3,158,365
Patented Nov. 24, 1964

3,158,365
MOUNTING OF WHEEL SUSPENSION ARMS OF VEHICLES
Lucien Péras, Billancourt, France, assignor to Regie Nationale des Usines Renault, Billancourt, France a French works
Filed Dec. 17, 1962, Ser. No. 245,203
Claims priority, application France, Jan. 23, 1962, 885,662, Patent 1,320,120
4 Claims. (Cl. 267—22)

This invention relates to the mounting of a wheel suspension system in a vehicle, of the type comprising a wheel carrier arm of which the pivot bar extending on either side of this arm is connected to the vehicle frame or body through the medium of a resilient mounting.

When a resilient mounting of this general character is also expected to "filter" the wheel beats by its inherent flexibility, it is difficult to devise a satisfactory solution, with important loads applied to the pivot bar, if a compromise is to be obtained between the necessity of causing the resilient wheel mounting to operate under preferential conditions in response to the wheel beats in order properly to filter these beats, and the necessity of avoiding movements of the wheel suspension arm likely to impair the road-holding and steering properties of the vehicle.

It is the essential object of the present invention to provide an improved wheel carrier arm mounting capable of meeting very satisfactorily the above requirements, this mounting being characterized essentially in that said pivot bar is connected to the chassis or frame of the vehicle at one end through at least one resilient bushing absorbing the wheel beats by its inherent flexibility, and at its other end through a bearing bracket constituting the centre of the angular displacement of said bar which is permitted by the resilient mounting of said first-named end.

Typical embodiments of wheel carrier arm mountings according to the present invention will now be described more in detail by way of example with reference to the accompanying drawing. In the drawing:

FIGURE 1 is a diagrammatic view showing an independent wheel suspension system according to a first form of embodiment of the invention;

FIGURE 2 is a detail view showing in axial section a detail of the mounting of the outer end of a pivot bar, which may be used in the arrangement of FIG. 1;

FIGURE 3 is a perspective view showing an independent wheel suspension system incorporating a different wheel carrier arm mounting according to this invention, and FIGURE 4 is an axial section showing one of the mounting bearing brackets of the embodiment of FIG. 3.

The train of wheels illustrated in FIG. 1 comprises for each wheel a longitudinal wheel carrier arm 1 mounted on a pivot bar 2 extending on either side of said arm.

This pivot bar 2 has one end connected to a bracket or like support 3 rigid with the chassis or frame of the vehicle (not shown) through the medium of a resilient bushing 4 adapted to receive shearing stress for absorbing the wheel beats. To this end, in the example illustrated in FIG. 1, the resilient bushing 4 constitutes a rubber ring fitted around the pivot bar 2 and has one side face secured on the bracket or like support 3 in which an aperture 5 is formed for the passage of the pivot bar 2, this aperture having dimensions sufficient to permit the desired free movement or beat of the bar 2.

At its opposite end the pivot bar 2 is carried by a bearing bracket 6 rigid with the frame or chassis of the vehicle and constituting a centre of angular beat for the pivot bar as permitted by the resilient mounting of the opposite end of this bar; this angular beat is illustrated diagrammatically in the figure by arrows extending in the vertical and horizontal direction. This bearing bracket 6 may consist notably either of a conventional ball-shaped member fitting in a suitable corresponding socket, or of a resilient bushing permitting the aforesaid angular beat of pivot bar 2 and of a type already known per se.

The distance between the bearings of pivot pin 2 may be suitably determined so that the permissible wheel movements caused by the angular beat of pivot bar 2 be consistent with the road holding properties of the vehicle or lead if desired to a controlled steering effect, this distance attaining if desired half the chassis width or even more when the two bars 2 of the train of wheels are not disposed end to end. Moreover, the position of the wheel carrier arm along the pivot bar may be determined as a function of the desired stress distribution among the bearings.

Preferably, the pivot bar 2 extends unequally on either side of the wheel carrier arm 1, the resilient bushing 4 being disposed on the end of bar 2 which is nearest to the wheel carrier arm, as shown in FIG. 1.

The elastic mounting of pivot bar 2 at one end may consist notably of the arrangement shown in FIGURE 2.

According to the embodiment of FIG. 2, the annular resilient member 10 is attached for example by cementing on the outer surface of an inner cylindrical sleeve member 11 force-fitted on the outer end of bar 2. The annular resilient member 10 is also cemented laterally on a pair of side plates 12, 13 adapted to be rigidly assembled with the frame or chassis of the vehicle. One plate 12 has formed therein a central aperture 14 permitting the free passage of the pivot bar 2 during its movements. The two plates 12, 13 are shown in this example as being secured on the side face of a longitudinal member 15 of the chassis frame of the vehicle, for example by welding. The resilient member 10 which in this case is subjected to torsion stress when the pivot bar 2 is rotated, has preferably a narrower cross-sectional area in its central portion, but this mounting of the resilient bushing may also be provided on the bar with the interposition of a conventional bearing member. Of course this elastic mounting by means of an annular bushing centered on the pivot bar 2 should not be construed as limiting the present invention, for a resilient mounting shifted laterally in relation of the pivot axis as described and illustrated in the patent application No. 179,932 of Mar. 15, 1962, and entitled "Mounting of wheel suspension arm of vehicle" may also be used. A typical example of a resilient mounting of this type is illustrated in FIG. 3 of the accompanying drawing.

This figure illustrates an independent-wheel torsion-bar suspension system wherein each torsion bar 16 extends internally of the tubular pivot rod 17 of the wheel arm 18. This pivot rod 17 is attached to the torsion bar 16 at their common end adjacent to the wheel by conventional splines or like means, the bar extending with its opposite end beyond the inner end of rod 17, this opposite end of bar 16 being rigid with a lever 19 adapted to permit the torsional adjustment of this torsion bar by being adjustably secured to the frame of the vehicle. In this example the suspension mounting of each wheel is shifted in relation to the mounting of the other wheel.

The pivot rod 17 of each wheel arm, which extends through substantially half the wheel track, is mounted as follows. At its end adjacent to the wheel the rod 17 is mounted in a support 20 constituting a plate lying in a plane perpendicular to the rod 17 and having one face cemented on a rubber block 21 having in turn its opposite face attached to a plate 22 for mounting the rod end on the frame. The rod 17 may be mounted in the support 20 by means of a resilient bearing or bushing of a type already known per se. At its other end the pivot rod 17 is mounted in a support bracket 23 carried by the frame of the vehicle and constituting a resilient bearing as shown in FIG. 4; this bearing permits the angular displacements of the rod 17 as consistent with the resilient mounting of its end adjacent to the wheel. It will be seen in FIG. 4 that in this example the support 23 carries a socket 24 having flanged edges receiving on either side elastic bushings 25, 26 fitting between this socket and the rod 17 and held laterally in position by flanged rings 27, 28 fitted on the rod 17.

Each support 23 comprises in this example a pair of elongated holes 29 permitting the vertically adjustable mounting of the support on the frame of the vehicle, according to the desired king pin inclination.

Although the resilient mounting described hereinabove should not be construed as limiting the scope of the present invention, the preferred mountings in this case are those capable of absorbing said wheel beats in a privileged manner in a vertical plane perpendicular to the axis of the pivot pin of the wheel arm.

I claim:

1. Mounting of wheel suspension arm for a vehicle which comprises a wheel carrier arm having a pivot bar extending on either side of the arm and connected to the frame of the vehicle through the medium of a resilient mounting, characterized in that said pivot bar has one first end connected to the frame of the vehicle through at least one resilient bushing having a principal flexibility perpendicular to said pivot bar for the absorption of the wheel beats and its other end also connected to the frame through a bearing socket constituting the centre of the angular displacement of said bar which is permitted by the resilient mounting of said first end.

2. Wheel suspension mounting according to claim 1, characterized in that said pivot bar extends unequally on either side of said arm and that said resilient bushing is provided at the bar end nearest to said arm.

3. Mounting of a suspension system for a pair of wheels of a vehicle comprising for each of said wheels a wheel carrier arm extending longitudinally with respect to the vehicle, a pivot bar secured to and extending on either side of said wheel carrier arm, said pivot bar having its first end, external to the interval between the carrier arms of said pair of wheels, connected to the frame of the vehicle through a resilient bushing having a privileged flexibility in a plane substantially perpendicular to said pivot bar, the second end of the latter being connected with said frame through a bearing socket located within said interval and constituting the center of the angular displacement of said pivot bar which is permitted by said resilient bushing, said pivot bar having a length at least equal to the half of the length of said interval.

4. Mounting of a suspension system according to claim 3, wherein said pivot bars are shifted one with respect to another and are hollow so that each of said pivot bars constitutes a sleeve for a torsion bar acting as a suspension spring and extending from one of the wheel carrier arms to the proximity of the other wheel carrier arm of said suspension system.

References Cited in the file of this patent

UNITED STATES PATENTS

| | | |
|---|---|---|
| 2,166,774 | Tjaarda | July 18, 1939 |
| 2,409,501 | Krotz | Oct. 15, 1946 |
| 2,951,710 | Willetts | Sept. 6, 1960 |
| 2,998,241 | Eyb | Aug. 29, 1961 |
| 3,080,176 | Erlandsen | Mar. 5, 1963 |
| 3,085,817 | Krause et al. | Apr. 16, 1963 |

FOREIGN PATENTS

| | | |
|---|---|---|
| 540,069 | Belgium | Aug. 13, 1955 |
| 1,250,215 | France | Nov. 28, 1960 |
| 1,034,487 | Germany | July 17, 1958 |